April 23, 1968   L. J. O'BRIEN   3,379,260
METHOD OF STORING HYDROCARBON FLUIDS USING A FOAM BARRIER
Filed Sept. 7, 1965

INVENTOR.
LEO J. O'BRIEN
BY
ATTORNEY.

United States Patent Office 3,379,260
Patented Apr. 23, 1968

3,379,260
METHOD OF STORING HYDROCARBON FLUIDS USING A FOAM BARRIER
Leo J. O'Brien, Crystal Lake, Ill., assignor to Union Oil Company of California, Los Angeles, Calif., a corporation of California
Filed Sept. 7, 1965, Ser. No. 485,356
8 Claims. (Cl. 166—9)

ABSTRACT OF THE DISCLOSURE

A method for confining hydrocarbon fluid in a natural subterranean storage reservoir having an open side by establishing a bank of foam along the open boundary of the reservoir capable of inhibiting the flow of fluid from the reservoir.

---

Figure 1:
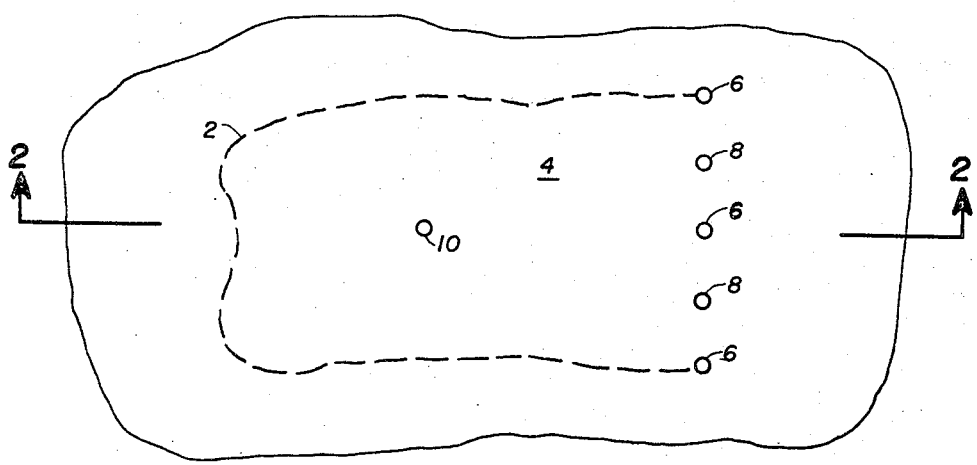

This invention relates to the underground storage of fluids. In one aspect the invention relates to a method of confining fluids stored in an underground porous formation wherein the underground formation does not form a naturally-occurring storage area. More specifically, one embodiment of this invention relates to the underground storage of hydrocarbons in subterranean formations such as aquifers which have an open end.

It is well known to store fluids, such as liquified petroleum gas and natural and other hydrocarbon gases, in natural subterranean formations, by injecting the fluids or gases under pressure through a well drilled into the formation. The most desirable formations in which to store fluids are mobile water-bearing, porous rock formations having a substantially impervious rock cap which seals the formation and prevents loss of the hydrocarbons to be stored. Such formations are commonly referred to as aquifers. The term "aquifer" will hereafter be used to mean subterranean, porous, mobile water-bearing rock formations overlain by an impervious rock cap which rock cap is substantially fluid impermeable. However, the number of these types of formations or aquifers is finite, and, generally, these types of formations, while having naturally-formed enclosures on the top and sides, are quite frequently open sided on one of the sides and communicate through this open side to a surrounding porous formation which makes the use of this particular type of formation as a storage area impossible. That is, if gas were to be injected through a centrally located well piercing the cap rock and communicating to the porous storage area beneath the cap rock, the injected gas would tend to channel through the open side and be lost to the surrounding formation.

It has now been discovered that a suitable subterranean hydrocarbon storage area may be formed by the use of foam wherein the subterranean formations are bounded by a fluid-impermeable roof stratum or cap rock and there is a naturally occurring side wall structure on at least three sides of the storage volume but one of the sides is open to the surrounding formation. By placing injection wells along the peripheral outer boundary of the open side of the storage area, it is possible to inject a surfactant solution into alternate wells and thence into the formation so that the subsequent contact of the surfactant solution with a gas will create a foam wall or barrier thereby forming a storage area which is fully enclosed on all sides. In order to assure the formation of a continuous foam wall across the open side of the storage area, it is imperative that the surfactant solution be injected into alternate wells of the plurality along the open side boundary of the storage area in an amount sufficient to produce a trace of the surfactant solution in the remaining wells of the plurality, thereby indicating the presence of surfactant solution across the entire length of the open side of the storage area. Thereafter, a gas may be injected into each one of the wells to thereby form the foam wall or alternatively, the hydrocarbon gas to be stored may be utilized as the foam generation medium.

An object of this invention is to store and recover hydrocarbons from porous underground formations.

Another object of this invention is to provide hydrocarbon storage reservoirs within porous underground formations where naturally existing confining structures are absent.

It is another object of this invention to provide a means of storing natural gas in open-ended formations, aquifers and reservoirs wherein the loss of stored gas is substantially reduced.

Figure 2:
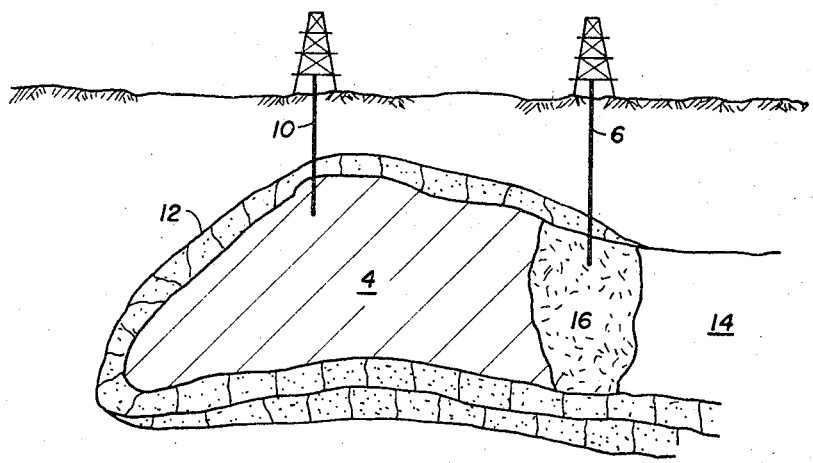

These and other objects of the invention will be further described and will become readily apparent from the following description read in conjunction with the drawings wherein:

FIGURE 1 is a plan view of the upper surface of a typical subterranean open-ended aquifer utilizing a line of wells to partially define the hydrocarbon storage area; and FIGURE 2 is a cross section taken along the line 2—2 of FIGURE 1.

Referring to FIGURE 1 the dotted line 2 denotes the outer boundary limits of an open-ended aquifer forming a suitable storage area 4 with an open end along a line intersecting the row of wells 6 and 8. Wells 6 and 8 are placed along the peripheral boundary line of the open end of storage area 4 and penetrate through the upper earth formation to the storage area. Centrally located well 10 also penetrates the upper earth formation and penetrates through the cap rock 12 and into the gas storage area 4, and provides the means by which the hydrocarbon to be stored may be injected into the storage area 4.

Referring to FIGURE 2, it is quite apparent that storage area 4, having cap rock 12 overlying the storage area, has a naturally occurring boundary except for the open end in line with well 6. Any hydrocarbon injected through well 10 and into storage area 4 would soon dissipate to the surrounding formation 14 if some means were not provided in line with well 6 to inhibit the migration of the hydrocarbon to be stored.

Now, in accordance with one embodiment of this invention, referring to both FIGURES 1 and 2, a solution is injected into alternate wells 6 after the hydrocarbon has been injected through well 10 into storage area 4 thereby displacing connate water towards the open end of the structure. Wells 6 and 8 remain open and are producing wells until the hydrocarbon to be stored approaches the boundary line formed by a line passing through wells 6 and 8. Thereafter, the wells 6 are converted to injection wells while wells 8 remain open. A surfactant solution containing a foaming agent or surfactant, which will cause foam upon being intimately contacted with a gas, is injected through wells 6 until the surfactant appears in the effluent of wells 8. Once the surfactant appears, the wells 6 and 8 are shut in and gas and hydrocarbon injection are continued through well 10, which continued injection will put the hydrocarbon in effective proximity to the surfactant solution to cause the generation of a tenacious foam thereby forming a foam barrier or wall 16 across the open end of storage area 4. A considerable amount of hydrocarbon may then be stored within storage area 4 without fear of losing the hydrocarbon to the remainder of the surrounding formation 14 through the open end. Where the hydrocarbon to be stored is a liquefied, normally gaseous one, the pressure around the surfactant solution in the formation may be decreased thereby allowing the lighter gases to come out of the liquefied solution to contact the surfactant solution and thereby form the foam. In the case of storing a gasiform fluid such as natural gas it is readily apparent that the continued injection of the natural gas will eventually cause the formation of foam bank 16.

It is readily apparent that one may form the foam bank or barrier prior to injecting the hydrocarbon to be stored by simply following the surfactant solution with a gasiform fluid such as air, carbon dioxide, flue gas, etc. This method will suffice particularly where a limited amount of mobile water is contained in the storage area and there is present a permeable storage area floor so as to allow the migration of connate water down through the storage area floor and thus out into the surrounding porous formation. It is preferred, however, to allow the line of wells defining the boundary of the open side to remain open as producing wells during hydrocarbon injection so as to facilitate the easy removal of connate water from the storage area as heretofore described. While the surfactant per se may be injected into the formation, for reasons of economy an aqueous surfactant solution is preferred. As foam producing agents, any one of a number of water-soluble surfactive agents which have foam producing properties may be used. Surface active agents which have the ability to produce a foam under formation, aquifer and reservoir conditions are hereinafter tabulated as nonlimiting examples.

| Trade name: | Chemical name |
|---|---|
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Duponol EP | Fatty alcohol alkylolamine sulfate. |
| Duponol WAQ | Sodium lauryl alcohol sulfate. |
| Ethomid HT-60 | Condensation of hydrogenated tallow amide and ethylene oxide. |
| Miranol HM Concentrate | Ethylene cycloiodo 1-lauryl, 2-hydroxy ethylene Na alcoholate, methylene Na carboxylate. |
| Miranol MM Concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Product BCO | C-cetyl betaine. |
| Sorbit AC | Sodium alkyl naphthalene sulfonate. |
| Sulfanole FAF | Sodium salt of fatty alcohols, sulfated. |
| Triton AS-30 | Sodium lauryl sulfate. |
| Triton X-100 | Alkyl aryl polyether alcohol. |

The surfactant or surface active agent will normally comprise about 0.01 to 5% by wt. of the surfactant solution.

Thus, it can be seen from the foregoing description that a foam barrier wall is formed across the open end of the storage area so that the injected hydrocarbon may be stored therein and be inhibited or even prohibited in some instances from escaping from the storage area through the open end to the surrounding permeable formations from which it may not be recovered. Those skilled in the art will readily appreciate the fact that a series of injection wells may be utilized for injecting the hydrocarbon to be stored and it is also readily apparent that the same well or wells that are used to inject the hydrocarbon may be also used as the withdrawal wells.

The distances between the wells located along the open end of the storage area are generally or preferably about 200 to 1000 ft. with a preferred distance of about 500 feet so as to insure the disposition of a surfactant band across the open end of the structure so that a continuous foam wall or barrier may be formed thereacross. Any number of wells may be utilized to disperse surfactant along the open end of the storage area and only economics will dictate the spacing as it is clear that the closer the spacing the more effective the foam barrier.

Once the hydrocarbon has been injected into the storage area and if in time the foam bank or barrier tends to degenerate thereby allowing some of the stored hydrocarbon to escape into the surrounding formation, the surfactant bank may be renewed or supplemented by merely utilizing the alternate wells again and injecting the surfactant solution allowing some of the hydrocarbon to contact the newly injected surfactant solution or alternatively injecting a gas after the newly injected surfactant solution to cause foam generation.

As an example of the invention, an aquifer having a permeability of 1,000 millidarcies, a porosity of 18%, a thickness of 100 feet, and an area of 108 sq. feet has a cap rock stratum overlying the gas storage area with the storage area having an open end communicating to a surrounding highly porous formation. The greatest lateral distance of the open-ended side is 1,000 ft. Two wells 500 feet apart are drilled along the open end boundary and are drilled to a depth to put the well bore in substantial communication with the gas storage area defined by the cap rock. A centrally located well is drilled through the cap rock to put the storage area in communication with the surface of the earth. Natural gas at the rate of 10MM s.c.f./day is injected while the two wells drilled along the open end remain open. After approximately 200MM s.c.f. of natural gas are injected, connate water begins to appear at the two wells located at the open end and is produced until natural gas appears in the effluent. Thereafter natural gas injection is terminated and a surfactant solution comprising a brine containing 0.1 wt. percent of Triton X-100 is injected into one of the wells while the remaining well produces effluent. Surfactant solution is injected until same appears at the open producing well. Once the surfactant appears in the effluent of the open producing well, both wells are shut in and natural gas injection through the central well is again commenced. The injected natural gas contacts the surfactant solution thereby generating a foam barrier across the open end of the aquifer.

It can thusly be seen that a new, efficient economical method for storing liquefied normally gaseous hydrocarbons, natural gas and hydrocarbon gases in subterranean formations having an open end has been discovered. Many modifications will become apparent to those skilled in the art and will not depart from the scope and spirit of the hereindisclosed invention.

The embodiments of the invention in which an exclusive property or privilege is granted are defined as follows:

1. A method for storing hydrocarbon fluids in a porous underground water-bearing formation defined by a fluid impermeable roof and sides and having one open side communicating said storage area with the surrounding formation, which comprises the steps of:
  injecting said fluid to be stored into said formation through at least one injection well communicating with said formation;
  producing water from a plurality of wells spaced in a line along the boundary of said open side of said formation until the injected fluid approaches said boundary;
  thereafter discontinuing the production of water from alternate of the wells along said boundary and injecting through these same wells a solution containing a small amount of an agent which causes foaming upon intimate contact of the solution with gas; and contacting said injected solution with gas to form a tenacious foam bank at the boundary of said storage area whereby escape of injected hydrocarbon fluid through said open side is inhibited.

2. A method according to claim 1 wherein said solution comprises an aqueous fluid containing about 0.01 to 5 wt. percent of a foaming agent.

3. A method according to claim 1 wherein said hydrocarbon fluid is a gas and said foam bank is formed by allowing a gaseous portion of said hydrocarbon fluid to be stored to contact said solution.

4. A method according to claim 1 wherein said boundary wells are spaced about 500 feet apart and natural gas is said hydrocarbon fluid.

5. A method according to claim 1 wherein said foam is formed by injecting a gas into each of said boundary wells after the injection of said solution.

6. A method according to claim 1 wherein said hydrocarbon fluid is liquefied petroleum gas and the pressure in said formation is decreased sufficiently to at least partially gasify the liquefied petroleum gas adjacent said boundary.

7. The method of storing natural gas in an open-ended aquifer penetrated by at least one central well and having a plurality of peripheral wells, not more than about 500 feet apart, along the open end of said aquifer consisting of the steps:

(a) injecting said natural gas under pressure into said central well;

(b) producing connate water from said peripheral wells until said natural gas approaches said open end;

(c) terminating production of connate water from alternate wells of said plurality and injecting into said alternate wells a surfactant solution until the surfactant solution appears in the effluent of said remaining wells, said surfactant solution being one which upon being intimately contacted with said gas will form a stable, tenacious foam under aquifer conditions;

(d) terminating surfactant solution injection and connate water production; and (e) continuing injection of said natural gas and allowing same to contact said surfactant solution whereby a stable foam is formed across the open end of said aquifer to thereby inhibit the loss of natural gas through said open end.

8. The method in accordance with claim 7 wherein said surfactant comprises about 0.01 to 5 wt. percent of said solution.

References Cited

UNITED STATES PATENTS

| | | | |
|---|---|---|---|
| 2,053,285 | 9/1936 | Grebe | 166—42 |
| 2,718,263 | 9/1955 | Heilman et al. | 166—9 X |
| 2,866,507 | 12/1958 | Bond et al. | 166—42 |
| 2,885,002 | 5/1959 | Jenks | 166—9 |
| 3,141,503 | 7/1964 | Stein | 166—29 |
| 3,152,640 | 10/1964 | Marx | 166—42 X |
| 3,175,614 | 3/1965 | Wyllie | 166—42 |
| 3,207,218 | 9/1965 | Holbrook et al. | 166—32 |
| 3,250,326 | 5/1966 | Witherspoon | 166—42 X |
| 3,302,707 | 2/1967 | Slusser et al. | 166—9 |

OTHER REFERENCES

Bernard, George G., et al.: Effect of Foam on Permeability of Porous Media to Gas, in Soc. of Petroleum Engineers Journal, September 1964, pp. 267–274.

CHARLES E. O'CONNELL, *Primary Examiner.*

ERNEST R. PURSER, *Examiner.*

IAN A. CALVERT, *Assistant Examiner.*